No. 752,752. PATENTED FEB. 23, 1904.
J. BOULET.
MICROMETER INDICATOR.
APPLICATION FILED JUNE 1, 1903.
NO MODEL.
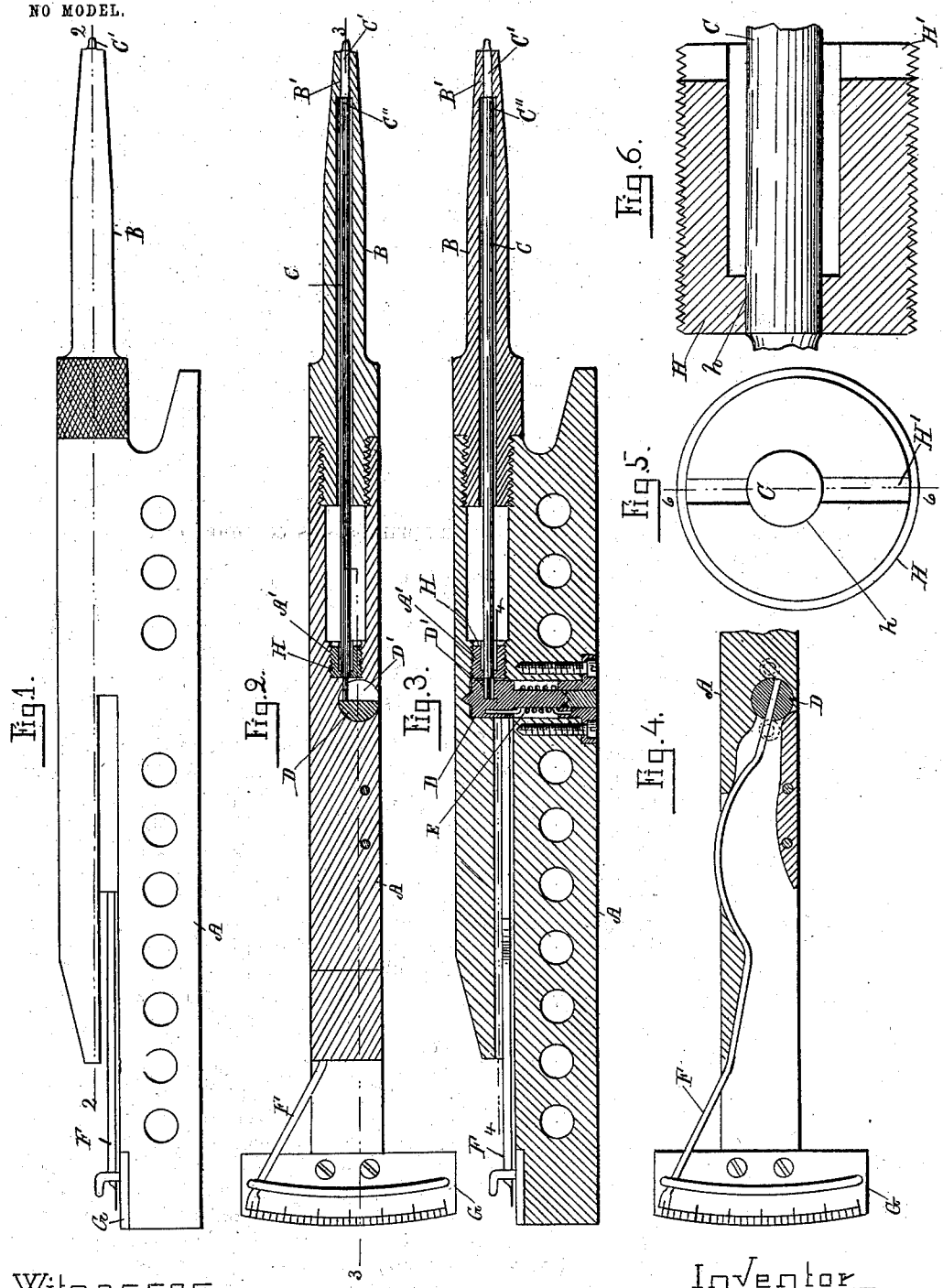
Witnesses.
Inventor
Joseph Boulet.

No. 752,752. Patented February 23, 1904.

UNITED STATES PATENT OFFICE.

JOSEPH BOULET, OF BEVERLY, MASSACHUSETTS.

MICROMETER-INDICATOR.

SPECIFICATION forming part of Letters Patent No. 752,752, dated February 23, 1904.

Application filed June 1, 1903. Serial No. 159,486. (No model.)

*To all whom it may concern:*

Be it known that I, JOSEPH BOULET, a citizen of Canada, and a resident of Beverly, in the county of Essex and State of Massachusetts, have invented certain new and useful Improvements in Micrometer-Indicators, of which the following is a specification.

This invention relates to improvements in micrometer-indicators for machinists' use of that kind in which a longitudinally-movable needle actuates a spring-pressed oscillating pivot-block to which is secured an index-arm the free end of which indicates upon a graduated scale the longitudinal adjustment of the needle corresponding to the thickness, depth, or size of an object to be measured. My present invention relates more especially to improvements on the device for this purpose shown and described in the Letters Patent granted to me September 10, 1901, No. 682,450; and it relates particularly to means for adjusting the position of the inner end of the needle where it bears against the pivot-block, so as to cause the movement of the needle to impart a corresponding and accurate movement to the index-arm, so as to read micrometically accurate in multiplication on the scale. In devices of this kind it is very difficult to locate the axial position of the longitudinally-movable needle relative to the oscillating pivot-block so as to obtain the accurate reading on the scale by the index-arm, and for this purpose I journal the inner end of the needle in an eccentrically-adjustable threaded bushing, as will hereinafter be more fully shown and described, reference being had to the accompanying drawings, wherein—

Figure 1 is a side elevation of a micrometer-indicator embodying my improvement. Fig. 2 is a longitudinal section on the line 2 2 shown in Fig. 1. Fig. 3 is a longitudinal section on the line 3 3 shown in Fig. 2. Fig. 4 is a sectional plan view on the line 4 4 shown in Fig. 3. Fig. 5 is an enlarged end view of the adjustable threaded eccentric bushing in which the inner end of the needle is adjustably journaled, and Fig. 6 is a cross-section on the line 6 6 shown in Fig. 5.

Similar letters refer to similar parts wherever they occur on the different parts of the drawings.

In the drawings, A is the body of the tool, to one end of which is screwed the bearing-sleeve B for the needle C, through the rear end of which projects the reduced end C' of said needle. The said needle has a shoulder C'', that is normally held against the reduced end B' of the outer end of the bearing-sleeve B by a spring, as is common in devices of this kind.

D is the pivot-block, which is journaled in bearings in the body A in a manner as fully shown and described in my aforesaid patent and need not here be described in detail. The pivot-block D has a diametrical slot D' milled therein, against the face of which is held the inner end of the needle C by the influence of a coiled spring E, one end of which is attached to said pivot-block and the other end to the bearing of the same, as shown in my aforesaid patent. To the said pivot-block is suitably secured the inner end of the index-arm F, the free outer end of which is movable on the graduated scale G on the body A, as usual.

The above construction of the micrometer-indicator is substantially like that shown and described in my patent aforesaid and is only shown and described for the purpose of illustrating my present improvement on devices of this kind.

In making micrometer-indicators of this kind it is very difficult to locate the axial line of the needle C relative to the pivot-block so as to obtain the proper and accurate reading of the index-arm F on the scale G corresponding to the longitudinal movement of the needle C, and for this purpose I locate and guide the inner end of the needle C in an adjustable externally-screw-threaded eccentric bushing H, which is adjustable in a screw-threaded female recess A' in the body A of the tool, as shown. Said bushing H is eccentric—that is, its bearing *h* for the needle C is out of alinement with the outer periphery of the screw-threaded portion of it—as shown in the enlarged detail views, Figs. 5 and 6, and by this arrangement said bushing may be turned around its axis more or less, so as to adjust the inner end of the needle C relative to the axis of the pivot-block for the purpose of causing the index-arm F to make an accurate reading on the graduated scale G corresponding to the longitudinal movement of the needle C during the use of the instrument. In practice I make a notch or recess H' on the outer end of said bushing H, adapted to be turned by a screwdriver or similar tool when adjusting the position of said bushing. By this arrangement the inner end of the needle C may be adjusted micrometically with great precision and nicety to and from the axis of the pivot-block D simply by turning the eccentric bushing H on its axis, so that the longitudinal movement of the needle shall coincide with the reading of the index-arm F on the scale G during the use of the instrument.

Having thus fully described the nature, construction, and operation of my invention, I wish to secure by Letters Patent and claim—

1. A micrometer-indicator, comprising a body, a needle longitudinally movable therein, a pivot-block and an index-arm attached thereto, in combination with an adjustable eccentric threaded bushing, in which the inner end of the needle is journaled for the purpose of adjusting the position of such inner end of the needle to and from the axis of the pivot-block, substantially as specified.

2. A micrometer-indicator, comprising a body, a needle longitudinally movable therein, a spring-pressed rotatable pivot-block journaled in said body, and having a cut-away recess thereon, and an index-arm attached to said pivot-block, in combination with an adjustable eccentric screw-threaded bushing, in which the inner end of the needle is journaled for the purpose of adjusting its position to and from the axis of the pivot-block, substantially as set forth.

In testimony whereof I have affixed my signature in presence of two witnesses.

JOSEPH BOULET.

Witnesses:
 ALBAN ANDRÉN,
 DENNIS W. QUILL.